United States Patent [19]

Geist et al.

[11] Patent Number: 5,427,661
[45] Date of Patent: Jun. 27, 1995

[54] AQUEOUS ELECTROCOATING BATHS CONTAINING SYNTHETIC RESINS CAPABLE OF DEPOSITION ON THE CATHODE, AND A PROCESS FOR COATING ELECTRICALLY CONDUCTING SUBSTRATES

[75] Inventors: Michael Geist, Ludwigshafen; Udo Strauss; Helmut Fobbe, both of Munster; Klaus Arlt, Senden; Walter Jouck, Munster, all of Germany; Klaus Cibura, Southfield, Mich.

[73] Assignee: BASF Lacke & Farben Aktiengesellschaft, Munster, Germany

[21] Appl. No.: 168,969

[22] PCT Filed: Jul. 8, 1988

[86] PCT No.: PCT/EP88/00610
§ 371 Date: Jan. 19, 1990
§ 102(e) Date: Jan. 19, 1990

[87] PCT Pub. No.: WO89/01017
PCT Pub. Date: Feb. 9, 1989

Related U.S. Application Data

[63] Continuation of Ser. No. 27,938, Mar. 8, 1993, abandoned, which is a continuation of Ser. No. 918,153, Jul. 17, 1992, abandoned, which is a continuation of Ser. No. 458,702, Jan. 19, 1990, abandoned.

[30] Foreign Application Priority Data

Jul. 29, 1987 [EP] European Pat. Off. ............ 87110956
Nov. 16, 1987 [DE] Germany ........................ 37 38 827.4

[51] Int. Cl.$^6$ .............................................. C25D 13/10
[52] U.S. Cl. ............................ 204/181.7; 204/181.4; 524/502; 524/543; 525/107; 526/332
[58] Field of Search ......................... 204/181.4, 181.7; 526/332; 525/107; 524/502, 543

[56] References Cited

U.S. PATENT DOCUMENTS

| 4,192,929 | 3/1980 | Wingfield | 523/404 |
| 4,692,267 | 9/1987 | Fock et al. | 252/321 |
| 4,871,591 | 10/1989 | Sugimura et al. | 427/409 |

FOREIGN PATENT DOCUMENTS

1316685 4/1993 Canada.

Primary Examiner—John Niebling
Assistant Examiner—Kishor Mayekar
Attorney, Agent, or Firm—Kenyon & Kenyon

[57] ABSTRACT

Aqueous electrocoating baths containing synthetic resins capable of deposition on the cathode, and a process for coating electrically conducting substrates The invention relates to aqueous electrocoating baths containing synthetic resins capable of deposition on the cathode. The electrocoating baths according to the invention are characterized in that they contain a homopolymer or copolymer of an alkyl vinyl ether of the general formula $CH_2=CH-O-R$ wherein R represents an alkyl radical having 2 to 4 C atoms.

11 Claims, No Drawings

AQUEOUS ELECTROCOATING BATHS CONTAINING SYNTHETIC RESINS CAPABLE OF DEPOSITION ON THE CATHODE, AND A PROCESS FOR COATING ELECTRICALLY CONDUCTING SUBSTRATES

This application is a continuation of U.S. application Ser. No. 08/027,938 filed Mar. 8, 1993, now abandoned, which is a continuation of U.S. application Ser. No. 07/918,153 filed Jul. 17, 1992, now abandoned, which is a continuation of U.S. application Ser. No. 07/658,702, filed Jan. 19, 1990, now abandoned.

The invention relates to aqueous electrocoating baths containing synthetic resins capable of deposition on the cathode.

Cationic electrocoating (CEC) is a surface coating process which is frequently used, above all, for priming, particularly in the field of automobile priming, in which water-dilutable synthetic resins carrying cationic groups are applied by means of direct current to electrically conducting articles.

Electrocoating baths of the type described above are disclosed, for example, in the following patent documents:

U.S. Pat. Nos. 3,799,854; 3,984,299; 4,031,050; 4,252,703 and 4,332,711, German Patent Specifications 3,108,073 and 2,701,002, EP 4,090, 12,463 and 59,895, and German Offenlegungsschriften 3,103,642 and 3,215,891.

Surface coatings of excellent quality can be achieved by means of surface coating systems of this type. However, surface defects (in particular craters) which are well known to those skilled in the art often occur in the stored paint film. The causes of these surface defects can lie in the nature of the components used for the electrodeposition paints (so-called causes inherent in the system). In most cases, however, impurities carried over into the electrocoating bath are the cause of the occurrence of the abovementioned surface defects. Examples of such impurities which may be mentioned are deep-drawing greases, anti-corrosion greases, joint-sealing materials, lubricating greases and the like.

When the surface coating material is deposited, these impurities are also introduced into the film. The abovementioned surface defects can then be formed when the paint film is stoved, because of incompatibility between the surface coating binder and the impurity.

A number of attempts to suppress the occurrence of surface defects by the addition of additives are known. Thus silicone oils, for example, can be added to the electrodeposition paints. Although the surface defects can be removed in this manner, problems then occur in overpainted paint films (such as, for example, filler and finishing paint) which are, as a rule, due to defective adhesion.

Attempts have also been made to improve, by means of suitable organic resins the resistance of electrocoating baths to contamination. Japanese Patent Application J 6 1,115,974 describes a reaction product formed from a polyepoxide resin modified with dimeric fatty acids and from a polyoxyalkylenepolyamine. This product stated to suppress the tendency to crater formation of CEC materials. EP-A 70,550 describes a reaction product of a polyepoxide resin with a polyoxyalkylenepolyamine containing primary amino groups. This material is also stated to improve paint films deposited by electrical means by eliminating or at least minimizing the tendency to crater formation. However, these products also result in persistent intercoat adhesion problems for fillers and finishing paints.

The objective on which the present invention is based consists in the provision of new aqueous electrocoating baths according to the preamble of patent claim 1. In particular, the problems of the state of the art described above are to be overcome or reduced.

This object is achieved, surprisingly, by the provision of aqueous electrocoating baths containing synthetic resins capable of deposition on the cathode, which baths are characterized in that they contain a homopolymer or copolymer of an alkyl vinyl ether of the general formula $CH_2=CH-O-R$, wherein R represents an alkyl radical having 2 to 4 C atoms.

The advantages achieved by means of the invention are to be seen essentially in the fact that the electrocoating baths according to the invention afford paint films which exhibit only slight surface defects or none at all, without the occurrence of adhesion problems in overpainted paint films. Surprisingly, the electrocoating baths according to the invention exhibit excellent resistance to contamination, that is to say the good surface properties of the stoved films are retained even if substances causing surface defects are carried over into the electrocoating baths according to the invention.

In principle, the electrocoating baths according to the invention can contain any extraneously-crosslinking or self-crosslinking synthetic resins capable of deposition on the cathode and which are suitable for the preparation of electrocoating baths.

Electrocoating baths containing cationic, amine-modified epoxide resins as the synthetic resins capable of deposition on the cathode are, however, preferred. Both self-crosslinking and extraneously-crosslinking cationic, amine-modified epoxide resins are known. It is preferable to employ extraneously-crosslinking cationic, amine-modified epoxide resins.

Cationic, amine-modified epoxide resins are to be understood as meaning cationic reaction products formed from (A) optionally modified polyepoxides,
(B) primary and/or secondary amines or salts thereof and/or salts of tertiary amines and, if appropriate,
(C) polyols, polycarboxylic acids, polyamines or polysulfides.

Polyepoxides are to be understood as meaning compounds containing two or more epoxide groups in the molecule.

Any compounds containing two or more epoxide groups in the molecule are suitable for use as component (A) for the preparation of the cationic, amine-modified epoxide resins. Preferred compounds are those which contain two epoxide groups in the molecule and have a relatively low molecular weight, not higher than 750, preferably 400 to 500.

(A) components which are particularly preferred are compounds which can be prepared by reacting (a) a diepoxide compound or a mixture of diepoxide compounds having an epoxide equivalent weight of less than 2,000 with
(b) a compound which contains a phenol or thiol group and reacts in a monofunctional manner towards epoxide groups under the reaction conditions quoted, or a mixture of such compounds, the components (a) and (b) being employed in a molar ratio of 10:1 to 1:1, preferably 4:1 to 1.5:1, and the reaction of the component (a) with the component (b) being carried out at 100° to 190° C., if appropriate in the presence of a catalyst (cf. German Offenlegungsschrift 3,518,770).

Other (A) components which are particularly preferred are compounds which can be prepared by a polyaddition reaction of a diepoxide compound and/or a mixture of diepoxide compounds, if appropriate together with at least one monoepoxide compound, which is carried out at 100° to 195° C., if appropriate in the presence of a catalyst, and is initiated by a monofunctionally reacting initiator carrying either an alcoholic OH group, a phenolic OH group or an SH group, to give an epoxide resin in which the diepoxide compound and the initiator are incorporated in a molar ratio of more than 2:1 to 10:1 (cf. German Offenlegungsschrift 3,518,732).

Polyepoxides which can be employed for the preparation of the particularly preferred (A) components and also as (A) components themselves are polyglycidyl ethers of polyphenols which have been prepared from polyphenols and epihalogenohydrins. Examples of polyphenols which can be employed particularly preferably are bisphenol A and bisphenol F. In addition, 4,4'-dihydroxybenzophenone, bis-(4-hydroxyphenyl)-1,1-ethane, bis-(4-hydroxyphenyl)-1,1-isobutane, bis-(4-hydroxy-tertiary-butylphenyl)-2,2-propane, bis-(2-hydroxynaphthyl)-methane, 1,5-dihydroxynaphthalene and phenolic novolac resins are also suitable.

Other suitable polyepoxides are polyglycidyl ethers of polyhydric alcohols, such as, for example, ethylene glycol, diethylene glycol, triethylene glycol, 1,2-propylene glycol, 1,4-propylene glycol, 1,5-pentanediol, 1,2,6-hexanetriol, glycerol and bis-(4-hydroxycyclohexyl)-2,2-propane.

It is also possible to employ polyglycidyl esters of polycarboxylic acids, such as, for example, oxalic acid, succinic acid, glutaric acid, terephthalic acid, 2,6-naphthalenedicarboxylic acid and dimerized linoleic acid. Typical examples are glycidyl adipate and glycidyl phthalate.

Hydantoin epoxides, epoxidized polybutadiene and polyepoxide compounds obtained by epoxidizing an olefinically unsaturated aliphatic compound are also suitable.

Modified polyepoxides are to be understood as meaning polyepoxides in which some of the reactive groups have been reacted with a modifying compound.

The following are mentioned as examples of modifying compounds:

a) Compounds containing carboxyl groups, such as saturated or unsaturated monocarboxylic acids (for example benzoic acid, linseed oil fatty acid, 2-ethylhexanoic acid or versatic acid), aliphatic, cycloaliphatic and/or aromatic dicarboxylic acids of varying chain lengths (for example adipic acid, sebacic acid, isophthalic acid or dimeric fatty acids), hydroxyalkylcarboxylic acids (for example lactic acid or dimethylolpropionic acid) and polyesters containing carboxyl groups or b) compounds containing amino groups, such as diethylamine or ethylhexylamine or diamines having secondary amino groups, for example N,N'-dialkylalkylenediamines, such as dimethylethylenediamine, N,N'-dialkylpolyoxyalkyleneamines, such as N,N'-dimethylpolyoxypropylenediamine, cyanoalkylated alkylenediamines, such as bis-N,N'-cyanoethylethylenediamine, cyanoalkylated polyoxyalkyleneamines, such as bis-N,N'-cyanoethyl-polyoxypropylenediamine, polyaminoamides, such as, for example, versamides, in particular reaction products containing terminal amino groups and formed from diamines (for example hexamethylenediamine), polycarboxylic acids, in particular dimeric fatty acids and monocarboxylic acids, in particular fatty acids, or the reaction product of one mole of diaminohexane with two moles of monoglycidyl ether or monoglycidyl ester, especially glycidyl esters of α-branched fatty acids, such as versatic acid, or c) compounds containing hydroxyl groups, such as neopentyl glycol, bisethoxylated neopentyl glycol, neopentyl glycol hydroxypivalate, dimethylhydantoin-N,N'-diethanol, 1,6-hexanediol, 2,5-hexanediol, 1,4-bis-(hydroxymethyl)-cyclohexane, 1,1-isopropylidenebis-(p-phenoxy)-2-propanol, trimethylolpropane or pentaerythritol or amino alcohols, such as triethanolamine or methyldiethanolamine, or alkylketimines containing hydroxyl groups, such as amino methyl-1,3-propanediol methyl isobutyl kerimine or tris-(hydroxymethyl)-aminomethane cyclohexanone kerimine, and also polyglycol-ethers, polyesterpolyols, polyetherpolyols, polycaprolactone-polyols or polycaprolactam-polyols of varying functionality and molecular weights or d) saturated or unsaturated methyl esters of fatty acids which are transesterified with hydroxyl groups of the epoxide resins in the presence of sodium methylate.

Primary and/or secondary amines or salts thereof and/or salts of tertiary amines can be used as the component (B), the secondary amines being particularly preferred components (B).

The amine should preferably be a compound which is soluble in water. Examples of such amines are monoalkylamines and diatkylamines, such as methylamine, ethylamine, propylamine, butylamine, dimethylamine, diethylamine, dipropylamine, methylbutylamine and the like. Alkanolamines, such as, for example, methylethanolamine, diethanolamine and the like, are also suitable. Dialkylaminoalkylamines, such as, for example, dimethylaminoethylamine, diethylaminopropylamine, dimethylaminopropylamine and the like, are also suitable. In most cases low-molecular amines are used, but it is also possible to use higher-molecular monoamines.

Polyamines containing primary and secondary amino groups can be reacted with the epoxide groups in the form of their ketimines. The ketimines are prepared in a known manner from the polyamines.

The amines can also contain other groups, but these should not interfere with the reaction of the amine with the epoxide group, nor should they result in the reaction mixture gelling, The charges required for dilutability with water and electrical deposition can be produced by protonation with water-soluble acids (for example boric acid, formic acid, lactic acid or preferably acetic acid) or by reacting the oxirane groups with salts of an amine.

The salt of a tertiary amine can be used as the salt of an amine.

The amine component of the amine-acid salt is an amine which can be unsubstituted or, as in the case of hydroxylamine, substituted, it being necessary that these substituents should not interfere with the reaction of the amine-acid salt with the polyepoxide and that the reaction mixture should not gel. Preferred amines are tertiary amines, such as dimethylethanolamine, triethylamine, trimethylamine, triisopropylamine and the like. Examples of other suitable amines are indicated in U.S. Pat. No. 3,839,252 in column 5, line 3, to column 7, line 42.

Polyols, polycarboxylic acids, polyamines or polysulfides or mixtures of compounds of these classes of substance are employed as the component (C).

The polyols which are suitable include diols, triols and higher polymeric polyols, such as polyesterpolyols or polyether-polyols.

Polyalkylene ether-polyols which are suitable for use as the component (C) correspond to the general formula

H—[O—(CHR)$_n$]$_m$—OH in which R is hydrogen or a lower alkyl radical, if appropriate containing various substituents, n is 2 to 6 and m is 3 to 50 or even higher. Examples are poly(oxytetramethylene) glycols and poly-(oxyethylene) glycols.

If polyether-polyols which can be obtained by reacting a cyclic polyol, such as, for example, hisphenol A, with ethylene oxide or with a mixture of ethylene oxide and an alkylene oxide containing 3 to 8 C atoms are employed as the component (C), cationic, amine-modified epoxide resins are obtained which are particularly preferred (cf. EP-A 74,634).

Polyester-polyols can also be used as the polymeric polyol component. The polyester-polyols can be prepared by polyesterifying organic polycarboxylic acids or their anhydrides with organic polyols containing primary hydroxyl groups. The polycarboxylic acids and the polyols are usually aliphatic or aromatic dicarboxylic acids and diols.

The diols used for the preparation of the polyesters include alkylene glycols, such as ethylene glycol, butylene glycol, neopentyl glycol and other glycols, such as cyclohexanedimethanol.

The acid component of the polyester consists primarily of low-molecular carboxylic acids or anhydrides thereof having 2 to 18 carbon atoms in the molecule. Examples of suitable acids are phthalic acid, isophthalic acid, terephthalic acid, tetrahydrophthalic acid, hexahydrophthalic acid, adipic acid, azelaic acid, sebacic acid, maleic acid and glutaric acid. Insofar as they exist, it is also possible to use the anhydrides of these acids instead of the acids.

Polyester-polyols derived from lactones can also be used as the component (C). These products are obtained by reacting an s-caprolactone with a polyol. Products of this type are described in U.S. Pat. No. 3,169,945.

The polylactone-polyols obtained as a result of this reaction are distinguished by the presence of a terminal hydroxyl group and by recurring polyester components derived from the lactone. These recurring components of the molecule can correspond to the formula

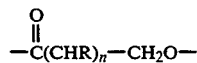

—C(CHR)$_n$—CH$_2$O— which n is at least 4, preferably 4 to 6, and the substituent is hydrogen, an alkyl radical, a cycloalkyl radical or an alkoxy radical.

Aliphatic and/or alicyclic polyfunctional alcohols or carboxylic acids having a molecular weight less than 350 are also employed as the component (C). It is advantageous for these to contain a branched aliphatic chain, in particular a chain having at least one neo structure.

Suitable compounds correspond to the following general formula:

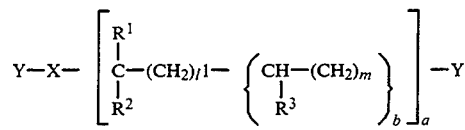

In this formula Y denotes OH or COOH, X denotes (CH$_2$)$_n$

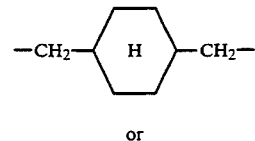

or

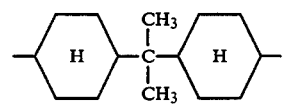

R$^1$, R$^2$ and R$^3$ denote H or an alkyl radical having 1 to 5 C atoms, a denotes 0 or 1, b denotes 0 or 1, 1 denotes 0–10, and m and n denote 1–10.

The following may be mentioned as examples: diols, such as ethylene glycol, diglycol, dipropylene glycol, dibutylene glycol, triglycol, 1,2-propanediol, 1,3-propanediol, 2,2-dimethyl-1,3-propanediol, 2,2-diethyl-1,3-propanediol, 2-methyl-2-ethyl-1,3-propanediol, 2-methyl-2-propyl-1,3-propanediol, 2-ethyl-2-butyl-1,3-propanediol, 1,2-butanediol, 1,4-butanediol, 2,3-butanediol, 2-ethyl-1,4-butanediol, 2,2-diethyl-1,3-butanediol, butene-2-diol-1,4,1,2-pentanediol, 1,5-pentanediol, 3-methyl-1,5-pentanediol, 1,6-hexanediol, 2,5-hexanediol, 2-ethyl-1,3-hexanediol, 2,5-dimethyl-2,5-hexanediol, 1,3-octanediol, 4,5-nonanediol, 2,10-decanediol, 2-hydroxyethyl hydroxyacetate, 2,2-dimethyl-3-hydroxypropyl-2,2-dimethylhydroxypropionate, 2-methyl-2-propyl-3-hydroxypropyl 2-methyl-2-propylhydroxypropiohate, 4,4'-methylenebiscyclohexanol and 4,4'-isopropylidenebiscyclohexanol. Some preferred diols are 2,2-dimethyl-1,3-propanediol, 3-methyl-1,5-pentanediol, 2,2-dimethyl-3-hydroxypropyl 2,2-dimethylhydroxypropionate and 4,4-isopropylidenebiscyclohexanol.

A large number of dicarboxylic acids are suitable for use as carboxylic acids, such as oxalic acid, malonic acid, 2,2-dimethylmalonic acid, succinic acid, glutaric acid, adipic acid, hexahydrophthalic acid, maleic acid, fumaric acid, pimelic acid, suberic acid, azelaic acid, sebacic acid, iraconic acid, citraconic acid and mesaconic acid.

Examples of dicarboxylic acids which are preferably employed are 2,2-dimethylmalonic acid and hexahydrophthalic acid.

It is also possible to employ long-chain dicarboxylic acids as component (C). Examples of these are dimeric fatty acids, such as, for instance, dimeric linoleic acid.

Polyamines which are suitable for use as component (C) can be prepared, for example, by reacting primary diamines and monoepoxides. The secondary substituted diamines formed modify the epoxide resins in a suitable manner.

It is also possible to use primary-tertiary diamines or alkanolamines, such as aminoethanol or aminopropanol, as the component (C).

Reaction products of organic dihalides with sodium polysulfide are suitable for use as polyfunctional SH compounds. Examples of further SH compounds are reaction products of linear polyesters, polyethers or polyurethanes containing hydroxyl groups with mercaptocarboxylic acids, such as mercaptoacetic acid, 2-mercaptopropionic acid, 3-mercaptopropionic acid, mercaptobutyric acid and the like.

Electrocoating baths which are very particularly preferred are obtained if the cationic, amine-modified epoxide resins employed are reaction products formed from (A) polyepoxides, (B) primary and/or secondary amines or salts thereof and/or salts of tertiary amines and (C) polyols, in particular polyester-polyols and/or polyetherpolyols.

The cationic, amine-modified epoxide resins can be employed both as extraneously-crosslinking synthetic resins and as self-crosslinking synthetic resins. Self-crosslinking cationic, amine-modified epoxide resins can be obtained, for example, by chemical modification of the cationic, amine-modified epoxide resins. A self-crosslinking system can be obtained, for example, by reacting the cationic, amine-modified epoxide resin with a partially blocked polyisocyanate which contains, on average, one free isocyanate group per molecule and in which the blocked isocyanate groups only become unblocked at elevated temperatures.

Preferred electrocoating baths are obtained if extraneously-crosslinking cationic, amine-modified epoxide resins in combination with a suitable crosslinking agent are employed as the synthetic resins capable of deposition on the cathode.

Examples of suitable crosslinking agents are phenoplasts, polyfunctional Mannich bases, melamine resins, benzoguanamine resins, blocked polyisocyanates and compounds containing at least two groupings of the general formula $R^1$—O—CO—.

The radical $R^1$ denotes $R^2$—O—CO—$CH_2$—, $R^3$—CHOH—$CH_2$— or $R^4$—CHOR$^5$—CHOH—$CH_2$— wherein $R^2$=alkyl, $R^3$=H, alkyl, $R^6$—O—$CH_2$— or $R^6$—CO—O—$CH_2$—, $R^4$=H or alkyl, $R^5$=H, alkyl or aryl and $R^6$=alkyl, cycloalkyl or aryl.

Preferred electrocoating baths are obtained if blocked polyisocyanates and/or compounds containing least two groupings of the general formula $R^1$—O—CO— are employed as the crosslinking agent.

The blocked polyisocyanates used can be any desired polyisocyanates in which the isocyanate groups have been reacted with a compound so that the blocked polyisocyanate formed is resistant to hydroxyl and amino groups at room temperature, but react at elevated temperatures, as a rule within the range from about 90° C. to about 300° C. Any desired organic polyisocyanates which are suitable for the crosslinking can be used in the preparation of the blocked polyisocyanates. Isocyanates containing about 3 to 36, in particular about 8 to about 15, carbon atoms are preferred. Examples of suitable di-isocyanates are hexamethylene diisocyanate, 2,4-toluylene diisocyanate, 2,6-toluylene diisocyanate and 1-isocyanatomethyl-5-isocyanato-1,3,3-trimethylcyclohexane. It is also possible to use polyisocyanates having a higher isocyanate functionality. Examples of these are trimerized hexamethylene diisocyanate and trimerized isophorone di-isocyanate. It is also possible to use mixtures of polyisocyanates. The organic polyisocyanates which are suitable for use as crosslinking agents in the invention can also be prepolymers derived, for example, from a polyol, including a polyether-polyol or a polyester-polyol.

Any desired suitable aliphatic, cycloaliphatic or aromatic alkyl-monoalcohols can be used for blocking the polyisocyanates. Examples of these are aliphatic alcohols, such as methyl, ethyl, chloroethyl, propyl, butyl, amyl, hexyl, heptyl, octyl, nonyl, 3,3,5-trimethylhexyl, decyl and lauryl alcohols; cycloaliphatic alcohols, such as cyclopentanol and cyclohexanol; and aromatic alkyl alcohols, such as phenylcarbinol and methylphenylcarbinol.

Other suitable blocking agents are hydroxylamines, such as ethanolamine, oximes, such as methyl ethyl ketone oxime, acetone oxime and cyclohexanone oxime, or amines, such as dibutylamine and diisopropylamine. The polyisocyanates and blocking agents mentioned can also be used, in suitable ratios, for the preparation of the partially blocked polyisocyanates mentioned above.

Examples of compounds containing at Least two groupings of the general formula $R^1$—O—CO— are bis-(carboalkoxymethyl) azelate, bis-(carboalkoxymethyl) sebacate, bis-(carboalkoxymethyl) adipate, bis-(carboalkoxymethyl) decanoate, bis-(carboalkoxymethyl) terephthalate, bis-(2-hydroxybutyl) azelate and bis-(2-hydroxyethyl) terephthalate.

As a rule, the crosslinking agent is employed in an amount of 5 to 60% by weight, preferably 20 to 40% by weight, relative to the cationic, amine-modified epoxide resin.

It is fundamental to the invention that the electrocoating baths in question should contain a homopolymer or copolymer of an alkyl vinyl ether of the general formula $CH_2$—O—R wherein R represents an alkyl radical having 2 to 4 C atoms.

Homopolymers or copolymers of this type are prepared by polymerizing an alkyl vinyl ether, if appropriate together with further copolymerizable monomers. The polymerization is carried out by well-known methods, preferably by cationic polymerization.

Preferred homopolymers or copolymers are those which can be obtained by polymerizing:

80 to 100% by weight of an alkyl vinyl ether of the general formula $CH_2$=CH—O—R wherein R represents an alkyl radical having 2 to 4 C atoms, preferably an ethyl radical, if appropriate together with up to 20% by weight of a copolymerizable monomer or a mixture of copolymerizable monomers.

The average molecular weight (weight average) of the resulting polymers should lie within the range from $5 \times 10^2$ to $1 \times 10^5$ g/mol, preferably within the range from $1 \times 10^3$ to $5 \times 10^4$ g/mol.

The molecular weight average mentioned above can be determined, for example, by gel permeation chromatography, for example under the following conditions:

Type of column: two columns containing a crosslinked polymer based on styrene and divinylbenzene as the column material (PL-gel 5 μ mixed columns, manufacturer: Polymer Laboratories) with a PL pre-column;

dimensions of the two columns first mentioned: 300×7.5 mm.

Type of detector: RI (refractive index) detector, Knauer differential refractometer, stage 8

Mobile phase: tetrahydrofuran

Sample concentration: approx. 2% strength in tetrahydrofuran

Volume sample injected: 50 μl

Flow rate of sample: 0.8 ml/minute

Calibration: 10 polystyrene standards having a known molecular weight of approximately 600 to 400,000; calibration straight lines drawn up by means of linear regression.

Alkyl vinyl ether monomers which are preferably employed are ethyl and (iso)propyl vinyl ethers, it is particularly preferable to employ ethyl vinyl ether.

Electrocoating baths which are very particularly preferred are those containing homopolymers of ethyl vinyl ether.

Styrene and alkyl (meth)acrylates, such as, for example, ethyl(meth)acrylate and methyl(meth)acrylate, are mentioned as examples of monomers which are copolymerizable with alkyl vinyl ethers.

The electrocoating baths according to the invention are prepared by methods which are generally well known. The synthesis of the synthetic resins capable of deposition on the cathode is effected by well-known methods (cf., for example, German Patent Specification 2,701,002 and the other patent documents quoted on page 1) in organic solvents. The synthetic resin solutions or dispersions thus obtained are converted, in a neutralized form, into an aqueous phase.

Pigments are preferably incorporated in the form of a pigment paste into the aqueous dispersion of resins capable of deposition on the cathode.

The preparation of pigment pastes is generally known and does not need to be explained in greater detail here (cf. D. H. Parker, Principles of Surface Coating Technology, Interscience Publishers, New York (1965); R. L. Yates, Electropainting, Robert Draper Ltd., Teddington/England (1966); H. F. Payne, Organic Coating Technology, Volume 2, Wiley and Sons, New York (1961)).

The pigment pastes are prepared by employing, for example, epoxide-amine adducts containing quaternary ammonium groups.

In principle, the pigment pastes can contain any pigments suitable for electrodeposition paints. In general, titanium dioxide is the only, or the principal, white pigment. Other white pigments or extenders, such as antimony oxide, zinc oxide, basic lead carbonate, basic lead sulfate, barium carbonate, porcelain, clay, calcium carbonate, aluminum silicate, silicon dioxide, magnesium carbonate and magnesium silicate, can, however, also be used. Examples of colored pigments which can be used are cadmium yellow, cadmium red, carbon black, phthalocyanine blue, chrome yellow, toluidyl red and hydrated iron oxide.

In addition to the pigments, the pigment paste can also contain plasticizers, fillers, wetting agents and the like.

The amount of pigment paste added to the aqueous dispersion of the synthetic resin capable of deposition on the cathode is such that the finished electrocoating bath has the properties required for the deposition. In most cases the weight ratio between the pigment and the synthetic resin capable of deposition on the cathode is 0.05 to 0.5.

There are several possible means of incorporating the alkyl vinyl ether homopolymers or copolymers employed in accordance with the invention into electrocoating baths. It is preferable to incorporate the alkyl vinyl ether homopolymers or copolymers employed in accordance with the invention into the pigment paste or into the solution or dispersion of organic synthetic resin. It can be advantageous in this regard incipiently to dissolve the polymers in question in a suitable solvent (for example butanol, ethyl acetate, butylglycol, methyl isobutyl ketone or white spirit). In some cases it can be beneficial to use emulsifiers as well.

From the point of view of principle, it is possible to incorporate the alkyl vinyl ether homopolymers or copolymers employed in accordance with the invention into the electrocoating baths at any point in the preparation of, and also after the completion of, the electrocoating baths.

The alkyl vinyl ether homopolymers or copolymers employed in accordance with the invention are incorporated into the electrocoating baths according to the invention in such amounts that the finished electrocoating baths preferably contain 10 to 10,000 ppm, particularly preferably 100 to 1,500 ppm and very particularly preferably 150 to 500 ppm, of the alkyl vinyl ether homopolymer or copolymer (the term ppm—parts per million—relates to parts by weight).

It will readily be understood that it is also possible to employ mixtures of different alkyl vinyl ether homopolymers or copolymers.

The action of the alkyl vinyl ether homopolymers or copolymers in preventing surface defects is particularly surprising, because the materials employed for this purpose in the past generally exhibit a surface activity which can be deduced from their chemical structure. They are frequently surfactants, such as, for example, silicones modified with polyethylene oxide or materials having a very low surface tension of approximately 20 to 25 mN/m. The alkyl vinyl ether homopolymers or copolymers employed in accordance with the invention however, do not have either the structure or the mode of action of surfactants, and have, at approximately 32 mN/m, a surface tension value which is customary for organic materials.

In addition to the synthetic resin capable of deposition on the cathode, the pigment paste and the alkyl vinyl ether homopolymer or copolymer, the electrocoating baths according to the invention can also contain further customary additives, such as, for example, additional solvents, antioxidants, surface-active agents and the like.

The solids content of the electrocoating baths according to the invention is preferably 7 to 35 parts by weight, particularly preferably 12 to 25 parts by weight. The pH of the electrocoating baths is between 4 and 8, preferably between 5 and 7.5.

The electrocoating baths according to the invention can be used for coating any desired electrically conducting substrates, but particularly for coating metals, such as steel, aluminum, copper and the like.

The invention also relates to a process for coating electrically conducting substrates, in which:

(1) the substrate is immersed in an aqueous electrocoating bath containing at least one synthetic resin capable of deposition on the cathode, (2) the substrate is connected as the cathode, (3) a film is deposited on the substrate by means of direct current, (4) the substrate is removed from the electrocoating (sic) and (5) the paint film deposited is stoved.

The process is characterized in that the aqueous electrocoating bath contains a homopolymer or copolymer of an alkyl vinyl ether of the general formula $CH_2=CH-O-R$ wherein R represents an alkyl radical having 2 to 4 C atoms.

The electrocoating bath is brought into contact with an electrically conducting anode and with the electrically conducting substrate, connected as the cathode. When an electric current is passed between the anode and the cathode, a firmly adhering film of paint is deposited on the cathode.

The temperature of the electrocoating bath should be between 15° and 35° C., preferably between 20° and 30° C.

The voltage applied can vary within a wide range and can, for example, be between two and a thousand volts. In a typical case, however, the process is carried out using voltages between 50 and 500 volts. The current density is, as a rule, between about 10 and 100 amperes/m$^2$. The current density tends to fall in the course of the deposition process.

After the deposition, the coated article is rinsed and is ready for storing.

In general, the paint films deposited are stored at temperatures from 130° to 200° C. for a duration of 10 to 60 minutes, preferably at 150° to 180° C. for a duration of 15 to 30 minutes.

The invention also relates to the use of homopolymers or copolymers of an alkyl vinyl ether of the general formula $CH_2=CH-O-R$ wherein R represents an alkyl radical having 2 to 4 C atoms as additives for aqueous electrocoating baths containing synthetic resins capable of deposition on the cathode. The effect of adding these alkyl vinyl ether homopolymers or copolymers is to suppress the formation of surface defects.

The invention is illustrated in greater detail in the following examples. Unless anything to the contrary is expressly stated, all data relating to parts and percentages are by weight.

1. Preparation of aqueous synthetic resin dispersions based on cationic, amine-modified epoxide resins 1.1 Preparation of a dispersion according to Example B of EP-A 70,550

|  | Weight (g) |
|---|---|
| Epikote 829[1] | 727.6 |
| Capa 200[2] | 268.4 |
| Xylene | 36.1 |
| Bisphenol A | 197.8 |
| Dimethylbenzylamine | 3.8 |
| Isocyanate crosslinking agent[3] | 901.3 |
| Diketimine formed from MIBK and diethylenetriamine, 75% strength in MIBK | 73.4 |
| N-methylethanolamine | 59.1 |
| Hexylglycol | 76.5 |
| Acetic acid | 33.5 |
| Emulsifier mixture | 29.4 |
| Demineralized water | 1793.1 |

[1] Epoxide resin made by Shell Chemie, epoxide equivalent 188
[2] Polyester-diol made by Interox Chemical
[3] Isocyanate crosslinking agent based on toluylene diisocyanate, masked with butylglycol and reacted with trimethylolpropane in a 3:1 ratio, incipiently dissolved in a 9:1 mixture of MIBK and N-butanol to give a 70% solids content solution
[4] Mixture of emulsifiers based on Geigy Amin C (Geigy Industrial Chemicals) 120 parts, Surfynol 104 (Air Products and Chemicals) 120 parts, butyl-glycol 120 parts and 221 parts of demineralized water containing 19 parts of glacial acetic acid. MIBK = methyl isobutyl ketone Instructions for preparation The Epikote 829, Capa 200 and xylene are initially placed in a reaction vessel and heated to 210° C. under $N_2$ protective gas. Water is then removed from the system for half an hour. The mixture is then cooled 150° C. and the hisphenol A and 1.6 parts of dimethylbenzylamine are added. The mixture is then heated to 180° C. and is kept at this temperature for half an hour. The mixture is then cooled to 130° C. and the remainder of the dimethylbenzylamine is added. After this the temperature is maintained for 2 ½ hours and the isocyanate crosslinking agent, the diketimine and the N-methylethanolamine are then added and the temperature is then kept at 110° C. for half an hour. The hexylglycol is then added. The reaction mixture is then dispersed in the demineralized water, containing the glacial acetic acid and the emulsifier mixture. A vacuum is then applied in order to remove the readily volatile organic solvents. The mixture is formulated to a solids content of 36%.

1.2 Preparation of a dispersion according to Example 2 of DE-A 3,108,073

1,093 parts of Araldit GY 2600 (epoxide equivalent weight EEW=188, epoxide resin based on bisphenol A made by Ciba-Geigy), 151 parts of neopentyl glycol and 4.9 parts of dimethylbenzylamine are initially placed in a reaction vessel. The temperature is raised to 131° C. and is kept at this level until the EEW has reached 415. 398 parts of Capa 200 (see item 1.1) and a further 3.8 parts of dimethylbenzylamine are then added. The temperature is kept at 131° C. until the EEW has reached 1,030. 1274 parts of the crosslinking agent (see item 1.1) and 112 parts of the diketimine also mentioned in Example 4 and 86 parts of N-methylethanolamine are then added, and the temperature is kept at 112° C. for 1 hour. 135 parts of phenoxypropanol and 40 parts of methoxypropanol are then mixed in, and mixing is continued for 15 minutes. This resin solution is dispersed in 3247 parts of water, 23.5 parts of glacial acetic acid and 21 parts of emulsifier mixture (see item 1.1).

The low-boiling solvents are then removed in vacuo and the mixture is formulated to a solids content of 35%.

2. Preparation of a pigment paste 2.1 Preparation of a grinding resin 800 parts of butylglycol are added to 953 parts of a commercially available epoxide resin based on bisphenol A and having an epoxide equivalent weight of 890. The mixture is heated to 80° C. 221 parts of a reaction product formed from 101 parts of diethanolamine and 120 parts of 80% strength aqueous lactic acid are then added to the resin solution. The reaction is carried out at 80° C. until the acid number has fallen to less than 1.

2.2 Preparation of the pigment paste 1,800 parts of the grinding resin are initially taken, together with 2,447 parts of demineralized water, and are vigorously mixed with 175 g of a 50% strength solution in methyl isobutyl ketone of an ethyl vinyl ether homopolymer (average molecular weight (weight average) between $10^3$ and $10^4$). The mixture is then combined with 2,460 parts of $TiO_2$, 590 parts of an extender based on aluminum silicate, 135 parts of lead silicate, 37 parts of carbon black and 25 parts of lead octoate. This mixture is comminuted in a grinding unit to a Hegman fineness of 5 to 7. 1,255 parts of demineralized water are then added in order to achieve the desired paste consistency.

3. Preparation of electrocoating baths according to the invention and deposition of coatings 196 parts of the pigment paste according to item 2 are added to 500 parts by weight of the dispersions according to item 1.1 or 1.2, and the mixture is formulated with demineralized water to a bath solids content of 20% by weight. The deposition of the paint films is carried out for 2 minutes at 300 volts on zinc-phosphated sheet steel. The bath temperature is 27° C. The films are stoved for 20 minutes at 180° C.

| | |
|---|---|
| Electrocoating bath 1: | Dispersion according to item 1.1 using paste according to item 2.2 |
| Electrocoating bath 2: | Dispersion according to item 1.1, using paste analogous to item 2.2, but with no ethyl vinyl ether homopolymer |
| Electrocoating bath 3: | Dispersion according to item 1.2, using paste according to item 2.2 |
| Electrocoating bath 4: | Dispersion according to item 1.2, using paste analogous to item 2.2, but with no ethyl vinyl ether homopolymer |

| Deposition results | | | | |
|---|---|---|---|---|
| | Electrocoating bath | | | |
| | 1 | 2 | 3 | 4 |
| Film thickness (μm) | 19 | 19 | 32 | 32 |
| Leveling[1] | 1.0 | 1.5 | 1.0 | 1.5 |
| Craters/dm² | 0.0 | 0.5 | 0.0 | 2.0 |

These films were then overcoated with a commercially available water filler and a white alkyd finishing paint and were tested for 240 hours in a condensation water constant climatic chamber. The adhesion of the films was then tested by means of the cross-cut test and Tesa detachment.

| | Electrocoating bath | | | |
|---|---|---|---|---|
| | 1 | 2 | 3 | 4 |
| Adhesion[2] | 0.5 | 0.5 | 0.5 | 0.5 |

The CEC baths were then contaminated with 0.1% of ASTM oil. The oil was stirred in for the course of one day. Deposition was then carried out from the baths as described above.

| | Electrocoating bath | | | |
|---|---|---|---|---|
| | 1 | 2 | 3 | 4 |
| Craters/dm² | 0 | >50 | 0 | >50 |

[1] Leveling: 0 to 5 (good-poor)
[2] Rating 0 to 5 (good-poor)

4. Preparation of aqueous synthetic resin dispersions containing a homopolymer or copolymer of an alkyl vinyl ether 4.1 As item 1.1, with the difference that, after 76.5 g of hexyl glycol have been added, there are also added 11.2 g of an ethyl vinyl ether homopolymer (average molecular weight (weight average) between $10^3$ and $10^4$).

4.2 As item 1.2, with the difference that, after 40 parts of methoxypropanol have been added, there are also added 15.6 parts of an ethyl vinyl ether homopolymer (average molecular weight (weight average) between $10^3$ and $10^4$).

5. Preparation of a pigment paste

As described under item 2.1 and item 2.2, but without the addition of the ethyl vinyl ether homopolymer.

6. Formulation of electrocoating baths according to the invention and deposition of coatings 196 parts of the pigment paste according to item 5 are added to 500 parts by weight of the dispersions according to item 4.1 or 4.2, and the mixture is formulated with demineralized water to a bath solids content of 20% by weight. The deposition of the paint films is carried out on zinc-phosphated sheet steel for 2 minutes at 300 volts. The bath temperature is 27° C. The films are stoved for 20 minutes at 180° C.

| | |
|---|---|
| Electrocoating bath 5: | Dispersion according to item 1.1, using paste according to item 5 |
| Electrocoating bath 6: | Dispersion according to item 4.1, using paste according to item 5 |
| Electrocoating bath 7: | Dispersion according to item 1.2, using paste according to item 5 |
| Electrocoating bath 8: | Dispersion according to item 4.2, using paste according to item 5 |

| Results of deposition | | | | |
|---|---|---|---|---|
| | Electrocoating bath | | | |
| | 5 | 6 | 7 | 8 |
| Film thickness (μm) | 19 | 20 | 34 | 34 |
| Leveling[1] | 1.0 | 1.0 | 0.5 | 0.5 |
| Craters/dm² | 0.5 | 0 | 3 | 0 |

These films were then overcoated with a commercially available water filler and a white alkyd finishing paint and were tested for 240 hours in a condensation water constant climatic chamber. The adhesion of the films was then tested by means of the cross cut test and by Tesa detachment.

| | Electrocoating bath | | | |
|---|---|---|---|---|
| | 5 | 6 | 7 | 8 |
| Adhesion[2] | 0.5 | 0.5 | 0 | 0 |

The CEC baths were then contaminated with 0.1% of ASTM oil. The oil was stirred in for the course of one day. Deposition was then carried out from the baths as described above.

| | Electrocoating bath | | | |
|---|---|---|---|---|
| | 5 | 6 | 7 | 8 |
| Craters/dm² | >50 | 0.5 | >50 | 0 |

7. Preparation of an aqueous synthetic resin dispersion based on a cationic, amine-modified epoxide resin 7.1 Preparation of an amine-modified epoxide resin 1,780 g of Epikote 1001[3], 280 g of dodecylphenol and 105 g of xylene are initially placed in a reaction vessel and are melted at 120° C. under an atmosphere of nitrogen. Traces of water are then removed from the system under a slight vacuum. 3 g of N,N-dimethylbenzylamine are then added and the reaction mixture is heated to 180° C. and kept at this temperature for approx. 3 hours until the epoxide equivalent weight (EEW) has risen to 1,162. The mixture is then cooled and 131 g of hexylglycol, 131 g of diethanolamine and 241 g of xylene are added in quick succession. In the course of this the temperature rises slightly. The reaction mixture is then allowed to cool to 90° C. and 183 g of butylglycol and 293 g of isobutanol are added to dilute it further. When the temperature has fallen to 70° C., 41 g of N,N-dimethylaminopropylamine are added and the mixture is kept at this temperature for 3 hours and is discharged.

The resin has a solids content of 70.2% and a base content of 0.97 milliequivalent/gram.

7.2 Preparation of a crosslinking agent 488 g of hexamethylene diisocyanate[1]) which has been trimerized via isocyanurate formation and 170 g of methyl isobutyl ketone are initially placed in a reaction vessel under an atmosphere of nitrogen and are heated to 50° C. 312 g of di-n-butylamine are then added dropwise at such a rate that the internal temperature is kept at 60° to 70° C. When the addition is complete the mixture is stirred for a further hour at 75° C. and is then diluted with 30 g of n-butanol and cooled. The crosslinking agent has a solids content of 79.6% (1 hour at 130° C.) and an amine number of less than 5 mg of KOH/g.

[1]) A commercial product made by BASF AG, having an isocyanate equivalent weight of 193.

7.3 Preparation of an aqueous synthetic resin dispersion 1,120 g of resin according to item 7.1 and 420 g of crosslinking agent according to item 7.2 are stirred room temperature. When the mixture is homogenous (15 minutes), 2.2 g of an antifoam solution[2]) and 18 g of glacial acetic acid are stirred in and 678 g of demineralized water are added in 4 portions. The mixture is then diluted with a further 1,154 g of demineralized water, in small portions. The mixture is then diluted with a further 1,154 g of demineralized water, in small portions.

[2]) Surfynol (commercial product made by Air Chemicals), 50% strength solution in ethylene glycol monobutyl ether.

The resulting aqueous dispersion is freed from low-boiling solvents by vacuum distillation and is then diluted with demineralized water to a solids content of 33%.

8. Preparation of a pigment paste 8.1 Preparation of a grinding resin as specified in German Offenlegungsschrift 3,422,457

640 parts of a diglycidyl ether based on hisphenol A and epichlorohydrin and having an epoxide equivalent weight of 485 and 160 parts of a similar product having an epoxide equivalent weight of 189 are mixed at 100° C. 452 parts of hexamethylenediamine are initially placed in another vessel and are heated to 100° C., and 720 parts of the above hot epoxide resin mixture are added in the course of one hour, slight cooling being necessary in order to keep the temperature at 100° C. After a further 30 minutes, the excess hexamethylene diamine is removed by increasing the temperature and reducing the pressure, a temperature of 205° C. and a pressure of 30 mbar being finally reached. 57.6 parts of stearic acid, 172.7 parts of dimeric fatty acid and 115 parts of xylene are then added. The water which has been formed is then removed by azeotropic distillation in the course of 90 minutes at 175° to 180° C. 58 parts of butylglycol and 322 parts of isobutanol are then added. The product has a solids content of 70% and a viscosity of 2,240 mPas, measured at 75° C. by means of a plate/cone viscometer.

8.2 Preparation of a pigment paste 586 parts of the grinding resin are initially taken together with 1,162 parts of demineralized water and 22 parts of glacial acetic acid, and are vigorously mixed with 37 parts of a 50% strength solution in butylglycol of an ethyl vinyl ether homopolymer (average molecular weight (weight average) between $10^3$ and $10^4$). The mixture is then combined with 880 parts of $TiO_2$, 250 parts of an extender based on aluminum silicate, 53 parts of lead silicate and 10 parts of carbon black. This mixture is comminuted in a grinding unit to a Hegman fineness of less than 12 μm. Demineralized water is then added in order to achieve the desired paste consistency.

9. Preparation of electrocoating baths according to the invention and deposition of coatings 700 parts of pigment paste according to item 8.2 are added to 2,200 parts by weight of the dispersion according to item 7.3, and the mixture is formulated with demineralized water to a bath solids content of 20% by weight. The deposition of the paint films is carried out for 2 minutes at 350 volts on zinc-phosphated sheet steel. The bath temperature is 27° C. The films are stoved for 20 minutes at 160° C.

| Electrocoating bath 1: | dispersion according to item 7.3, using paste according to item 8.2 |
|---|---|
| Electrocoating bath 2: | dispersion according to item 7.3, using paste analogous to item 8.2, but with no ethyl vinyl ether homopolymer |

| Deposition results: | | |
|---|---|---|
| | Electrocoating bath | |
| | 1 | 2 |
| Film thickness (μm) | 20 | 20 |
| Leveling[1]) | 1.5 | 1.5 |
| Craters/dm$^2$ | 0 | 0.5 |

These films were then overcoated with a commercially available water filler and a white alkyd finishing paint and were tested for 240 hours in a condensation water constant climatic chamber. The adhesion of the films was then tested by means of the cross-cut test and Tesa detachment.

| | Electrocoating bath | |
|---|---|---|
| | 1 | 2 |
| Adhesion[1]) | 0.5 | 0.5 |

The CEC baths were then contaminated with 0.1% of ASTM oil, The oil was stirred in for the course of one day, Deposition was then carried out from the baths as described above.

| | Electrocoating bath | |
|---|---|---|
| | 1 | 2 |
| Craters/dm$^2$ | 0 | 50 |

We claim:

1. An aqueous electrocoating bath containing synthetic resins capable of deposition on a cathode to form a coating and also containing contaminants capable of forming defects in a surface of the coating deposited from the bath, the bath also including an amount of a homopolymer of an alkyl vinyl ether of the general formula $CH_2=CH-O-R$ wherein R represents an alkyl radical having 2 to 4 carbon atoms, effective to abate formation of defects caused by the contaminants in the deposited coating surface.

2. An electrocoating bath as claimed in claim 1, which contains, as the synthetic resin capable of deposition on the cathode, a cationic, amine-modified epoxide resin.

3. A method for reducing surface defects in electrodeposited films on electrically conducting substrates comprising
   a. immersing the substrate in an aqueous electrocoating bath containing at least one synthetic resin to be deposited on a cathode, and surface defect forming contaminants, as well as an amount of a homopolymer of an alkyl vinyl ether of the general formula $CH_2=CH-O-R$, wherein R represents an alkyl radical of 2 to 4 carbons, effective to reduce defect formation by the contaminants,
   b. connecting the substrate as the cathode,
   c. depositing a film on the substrate by means of direct current,
   d. removing the substrate from the electrocoating bath, and
   e. baking the deposited paint film, to provide a coating substantially free of surface defects caused by contaminants.

4. A process as claimed in claim 3, wherein the electrocoating bath contains as the synthetic resin deposited on the cathode, a cationic, amine-modified epoxide resin.

5. In a method of electrocoating from a cathodic deposition bath which contains in addition to coating film formers, contaminants causing surface defects in the film, an improvement comprising the step of including in the bath an amount of a homopolymer of an alkyl vinyl ether of the formula $CH_2=CH-O-R$ wherein R is 2 to 4 carbon atoms effective to abate formation of surface defects in the film caused by contaminants.

6. The method according to claim 5 wherein the bath includes a polymer selected from the group consisting of cationic amine-modified epoxy resins.

7. The method according to claim 6 wherein the resin is the reaction product of a polyepoxide, an amine and a component selected from the group consisting of polyols, polycarboxylic acids, polyamines and polysulfides.

8. The method according to claim 7 wherein the polyepoxide contains two epoxy groups per molecule and has a molecular weight of not higher than about 750.

9. The method according to claim 5 containing about 10 to 10,000 ppm of the homopolymer of the alkyl vinyl ether.

10. The method according to claim 5 wherein the bath contains 150–500 ppm of the homopolymer of the alkyl vinyl ether.

11. The electrocoating bath according to claim 1 wherein the alkyl vinyl ether in the bath is ethyl vinyl ether homopolymer.

* * * * *

UNITED STATES PATENT AND TRADEMARK OFFICE
CERTIFICATE OF CORRECTION

PATENT NO. : 5,427,661          PAGE 1 OF 2
DATED : 27 JUNE 1995
INVENTOR(S): Michael GEIST et al.

It is certified that error appears in the above-identified patent and that said Letters Patent is hereby corrected as shown below:

IN THE ABSTRACT: Delete lines 1-3 and do not indent lines 5-10.

| Column | Line | |
|---|---|---|
| 1 | 35 | Change "stored" to --stoved--. |
| 1 | 63 | Before "stated" insert --is--. |
| 5 | 62 | Before "which" insert --in--. |
| 8 | 28 | Change "Least" to --least--. |
| 11 | 26 | Change "storing" to --stoving--. |
| 11 | 27 | Change "stored" to --stoved--. |
| 13 | 57 | Change "et her" to --ether--. |
| 15 | 35 | Move footnote 2) to after line 39. |

UNITED STATES PATENT AND TRADEMARK OFFICE
CERTIFICATE OF CORRECTION

PATENT NO. : 5,427,661

DATED : 27 June 1995

INVENTOR(S) : Michael GEIST et al.

It is certified that error appears in the above-identified patent and that said Letters Patent is hereby corrected as shown below:

| Column | Line | |
|---|---|---|
| 16 | 34 | Insert the following footnote: <br> --1) Leveling: 0 to 5 (good - poor)--. |
| 16 | 47 | Insert the following footnote: <br> --1) Rating 0 to 5 (good - poor)--. |

Signed and Sealed this

Seventeenth Day of December, 1996

Attest:

BRUCE LEHMAN

*Attesting Officer*     *Commissioner of Patents and Trademarks*